United States Patent [19]
Meritt et al.

[11] Patent Number: 5,640,603
[45] Date of Patent: Jun. 17, 1997

[54] LOGICAL PATH SCHEDULER FOR DISCONNECTING CURRENTLY CONNECTED PATHS TO ENABLE LOGICAL PATHS AWAITING CONNECTION TO CONNECT BASED ON PATH CONTROL TABLES THEREOF

[75] Inventors: Allan Samuel Meritt, Poughkeepsie; Andrea Lynn Sheber; Harry Morris Yudenfriend, both of Wappingers Falls, all of N.Y.

[73] Assignee: International Business Machines Corporation, Armonk, N.Y.

[21] Appl. No.: 188,994

[22] Filed: Jan. 28, 1994

Related U.S. Application Data

[63] Continuation of Ser. No. 968,652, Oct. 30, 1992, abandoned.

[51] Int. Cl.⁶ .................................................. H01J 3/00
[52] U.S. Cl. ............................................ 395/858; 395/837
[58] Field of Search ................................. 395/200, 275, 395/250, 550, 858, 837

[56] References Cited

U.S. PATENT DOCUMENTS

| | | | |
|---|---|---|---|
| 3,969,589 | 7/1976 | Meise, Jr. et al. | 379/266 |
| 4,207,609 | 6/1980 | Luiz et al. | 395/325 |
| 4,435,755 | 3/1984 | Meritt | 395/275 |
| 5,151,977 | 9/1992 | Fredericks et al. | 395/200 |
| 5,265,091 | 11/1993 | van Landgem | 370/60 |
| 5,297,262 | 3/1994 | Cox et al. | 395/325 |

OTHER PUBLICATIONS

SC23-0427-01—"Automating the Enterprise Systems Connection Manager Through the Application Programming Interface" Manual.
SA22-7202-02—"Enterprise Systems Architecture/390 ESCON I/O Interface" Manual.
GA23-0383-01—"Introducing Enterprise Systems Connection" Manual.
SC23-0425-01—"Using the Enterprise Systems Connection Manager" Manual.
SC23-0422-01 "Introducing the Enterprise Systems Connection Manager" Manual.

Primary Examiner—Thomas C. Lee
Assistant Examiner—Sang Hui Kim
Attorney, Agent, or Firm—William A. Kinnaman, Jr.

[57] ABSTRACT

A dynamic switch connects a control unit to a plurality of channels on one or more processors, each processor controlled by an operating system. A logical path scheduler (LPS) within a master operating system in one of the processors contains a path control table which contains an entry for each control unit, system, and logical path combination—each entry indicating current path status (connected or disconnected), and time in that status. I/O requests within the systems for which no path currently exists are queued, and the LPS initiates connections and disconnections for the paths to equitably allocate the maximum number of simultaneous path connections allowed for the control unit, among more than that maximum number of contending channels.

19 Claims, 4 Drawing Sheets

FIG. 2

PATH CONTROL TABLE 200

| CUID 210 | SYSID 211 | PORT 213 | PORT 214 | SWID 215 | STAT 216 | CNTIME 217 | WTTIME 218 |
|---|---|---|---|---|---|---|---|
| | | PATHID 212 | | | | | |
| | | PORT 1 | PORT 2 | | | | |
| A | 1 | F0 | 30 | 1 | C | 7 | 0 |
| A | 1 | F1 | 30 | 2 | N | 0 | 7 |
| A | 2 | F0 | 00 | 1 | N | 0 | 9 |
| A | 2 | F1 | 10 | 2 | C | 6 | 0 |
| A | 3 | F0 | 10 | 1 | N | 0 | 8 |
| B | 1 | F2 | 30 | 1 | C | 9 | 0 |
| B | 2 | F2 | 00 | 1 | N | 0 | 6 |
| B | 3 | F2 | 10 | 1 | N | 0 | 5 |

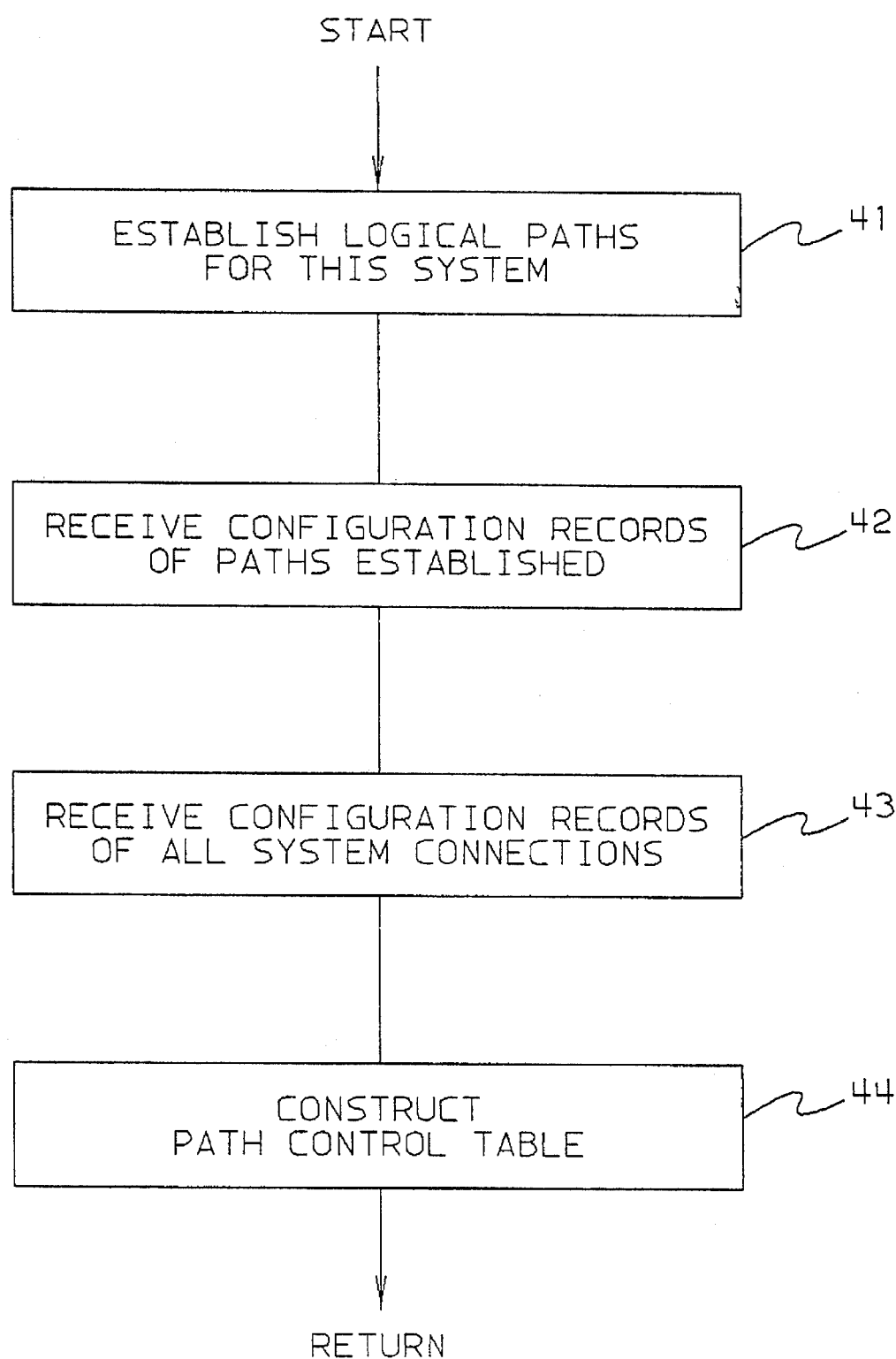

LOGICAL PATH SCHEDULER FOR DISCONNECTING CURRENTLY CONNECTED PATHS TO ENABLE LOGICAL PATHS AWAITING CONNECTION TO CONNECT BASED ON PATH CONTROL TABLES THEREOF

This is a continuation of application Ser. No. 07/968,652 filed on Oct. 30, 1992 now abandoned.

FIELD OF INVENTION

The present invention is related to the establishment of logical paths from a processor (central processing unit) through a channel to a control unit in a computer input/output (I/O) system, and is more particularly related to the establishment of logical channel paths between processors, channels and control units where a dynamic switch is located between one or more of the channels and one or more of the control units.

BACKGROUND OF THE INVENTION

In a technical environment such as IBM's ESCON I/O interface, (see for example IBM publication SA22-7202-02, "ESA/390 ESCON I/O Interface"), it is required that a logical path be established between a channel and a control unit before communication for I/O from the processor can proceed. Control units have limitations on the maximum number of logical paths (and physical paths) they can support. This limits the number of channels (and thereby processors and systems) that can access the control units even though the dynamic switch located between the channel and the control unit may have a lesser limitation on logical paths. Prior art allows the ability to dynamically disconnect and connect channels and control units via serial I/O links and a dynamic switch. This facility is described in U.S. Pat. No. 5,107,489, "Switch and its Protocol for Making Dynamic Connections" issued Apr. 21, 1992, by Paul J. Brown, et al., assigned to the assignee of the present invention, and incorporated herein by reference. In prior art the capability exists to share physical paths (via logical paths), but the capability of this sharing is limited by the capacity of the control unit. The number of concurrent connections is limited by the maximum number of logical paths the control unit can support. In the prior art once the maximum number of logical paths a control unit can support are connected, any further requests for connection (for example from other processors) are rejected. This rejection results in an inability to initiate any work in the rejected processor that would utilize I/O devices attached to the rejecting control unit. This limitation of the number of logical paths proves to be a significant connectivity constraint, especially since the ESCON topology allows all channels (processors) connecting to a dynamic switch to have access to all control units (and I/O devices) connected to that dynamic switch. This is referred to as any to any connectivity.

For I/O devices that support dynamic pathing (which includes all DASD devices attached through the ESCON I/O interface), in IBM's MVS/ESA operating system implementation, if the last path to the device becomes not operational (due to errors, configuration failures, etc) the device is isolated, "boxed", by the I/O supervisor program. This boxing forces the device to become off-line and forces all work currently allocated to the device to have outstanding, or future, I/O fail. This usually causes the work to fail and be terminated.

SUMMARY OF THE INVENTION

The present invention provides for the placement of a Logical Path Scheduler (LPS) function in a "master" operating system in an interconnected set of systems (processors plus operating systems). This LPS, through a Path Control Table, initiates timely connections and disconnections to ensure that all channels needing paths are provided with such paths despite the control unit connectively limitations.

It is an object of the invention described to have the effect of an unlimited number of logical paths, providing virtual logical paths. The only limitations on the number of virtual logical paths that can be supported will be resource limitations within the systems (e.g. memory size) and the dynamic switch.

It is further an object of this invention to provide a control table which describes the topology of all connections within the I/O system.

It is further an object of this invention to provide a scheduling program which uses this control table to establish and relinquish logical path connections between systems and control units making up the computer I/O system.

It is further an object of this invention to provide an algorithm (in the preferred embodiment, based on time intervals) to determine when to change logical path connections.

It is further an object of this invention to provide an initialization procedure for constructing this control table and adjusting this control table upon dynamic change of the configuration topology.

It is further an object of this invention to have device-level I/O requests queued for execution, by the operating system, when the virtual logical path is in an unconnected state.

It is further an object of this invention to use this queuing mechanism when the last path to a device becomes not operational.

It is further an object of this invention to have previously queued I/O resume when the virtual logical path becomes connected, or when the not operational device becomes operational.

These and other objects, features and advantages of the invention will be apparent from the following more particular description of the preferred embodiment of the invention as illustrated in the drawings.

BRIEF DESCRIPTION OF THE DRAWINGS

FIG. 2 shows the format of the control table describing the relationships and status of control units to systems to dynamic switches.

FIG. 4 is a flowchart showing the high level logic flow of the system initialization function with respect to establishing logical path configurations and the construction of the Path Control Table.

DESCRIPTION OF THE PREFERRED EMBODIMENT

Figure 1:
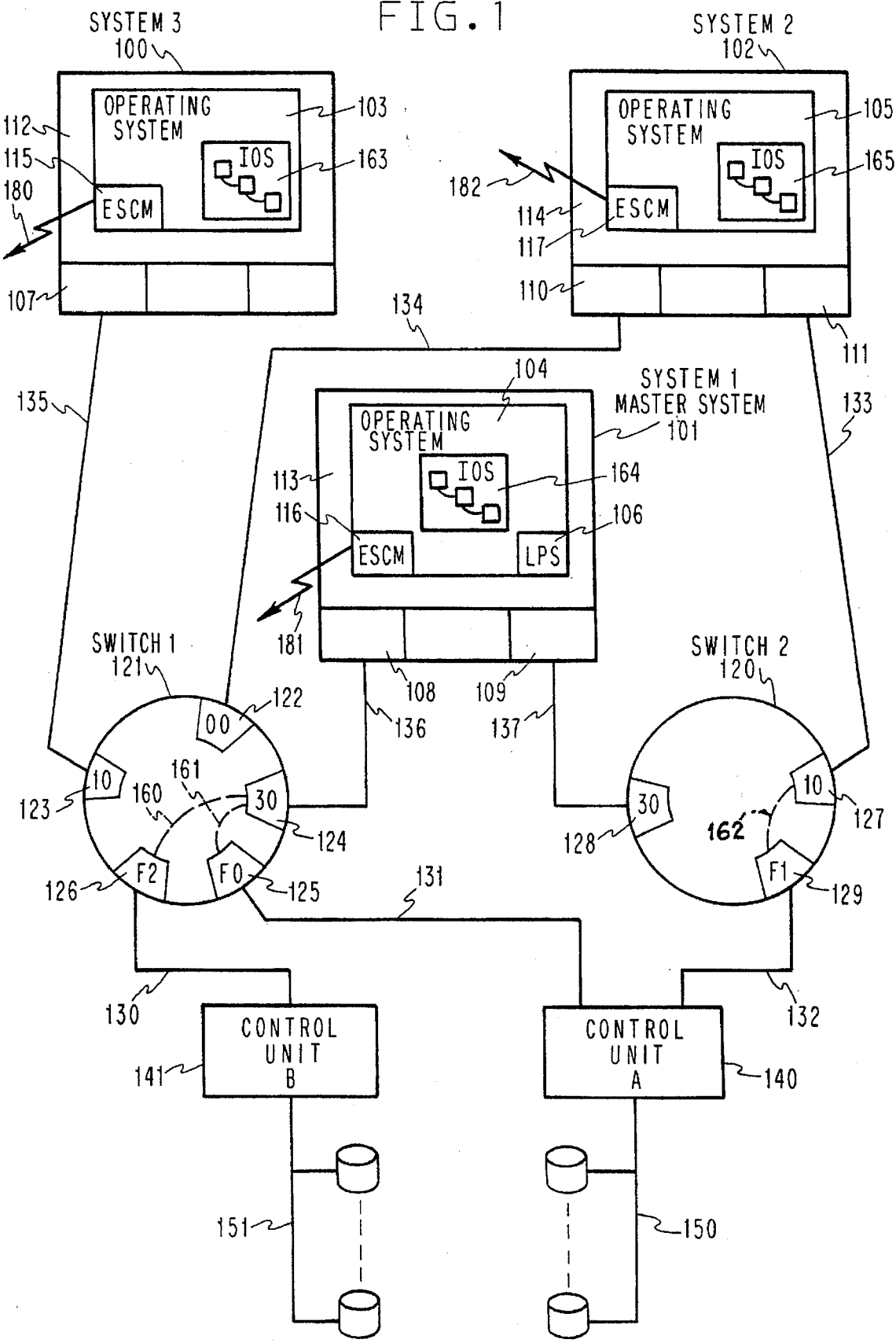
FIG. 1 is a system diagram for the present invention showing processors (central processing units), executing operating systems, connected to control units (with devices attached) through connection to dynamic switches.

The preferred embodiment is depicted in the accompanying figures and the following description. FIG. 1 shows multiple systems, 100, 101, 102, each comprised of a processor (Central Processing Unit) 112, 113, 114, each executing an operating system (such as the IBM MVS/ESA operating system), 103,104,105, and each connected to one or more dynamic switches (such as the IBM 9032, ESCON Director), 120, 121, through links, 133–137. The systems, 100, 101, 102, are conventionally attached to channels, 107–111, which are attached to the dynamic switches, 120, 121, through links 133–137 in a manner described, e.g., in co-pending application Ser. No. 07/576,561, "Logical Channel paths in a computer I/O System", by J. C. Elliott, filed Aug. 31, 1990, and incorporated herein by reference. Each of the dynamic switches, 120, 121, are connected to input/output (I/O) control units (such as the IBM 3990 DASD Storage Controller), 140, 141, via links, 130–132. Each of the control units, 140, 141, control access to one or more I/O devices, 150, 151. Each of the dynamic switches, 120,121, have ports, 122–129, through which the links, 130–137, attach. In this FIG. 1, switch 1, 121, has ports 00 (122), 10 (123), 30 (124), F0 (125) and F2 (126). Switch 2, 120, has ports 10 (127), 30 (128) and F1 (129). A logical path is established when a dynamic switch connects two of its ports thereby completing a connection of links between a system and a control unit. In FIG. 1, the phantom lines indicate such connections, or logical paths, 160–162. System 1, 101, is connected to control unit B, 141, through logical path F2-30 (160), and to control unit A, 140, through logical path F0-30 (161). System 2, 102, is connected to control unit A, 140, through logical path F1-10 (162). Device-level I/O can only occur through these logical paths (160–162). As can be seen in FIG. 1, control unit B, 141 has a limitation of only one logical path (through port F2 (126) in switch 1, 121), while control unit A, 140, has a limitation of two logical paths (through port F0 (125) in switch 1, 121, and port F1 (129) in switch 2, 120). System 3, 100, is attached to switch 1, 121, via a link, 135, but is not currently connected to either control unit A or B, 140, 141. Any device-level I/O requests emanating from system 3, 100, or from systems 1 and 2, 101,102, on links currently not connected, 134, 135, 137 are queued by the Input/Output supervisor program, 163–165, in the operating system, 103–105, in those processors, 112–114, until such time as they are connected to the desired control units, 140, 141. This queuing of I/O requests in the IOS program of MVS/ESA is well known in the art. This ability to have systems appear to have logical path connections in excess of the maximum logical path connections supported by a control unit creates the notion of and invention of virtual logical paths.

FIG. 2 shows an apparatus called the Path Control Table, 200. The Path Control Table contains entries describing the relationships between control units, 140, 141, systems, 100–102, and dynamic switches, 120, 121. The entries are grouped together by control unit. Each group of entries for a control unit is called a "block" of entries. Additionally, each entry contains the status of connected or disconnected and other pertinent information about the relationships. There are eight fields within an entry, the fields are depicted as follows CUID, 210—which contains the id of the control unit SYSID, 211—which contains the id of the system requiring connection PATHID, 212—which contains the id of the logical path and consists of the following two fields PORT1, 213—which contains the id of the port attaching the control unit to the dynamic switch PORT2, 214—which contains the id of the port attaching the system to the dynamic switch SWID, 215—which contains the id of the dynamic switch containing the PORT1, 213, and the PORT2, 214, through which the SYSID, 211, is to be connected to the CUID, 210

STAT, 216—which contains an indicator representing the status of this connection (CUID, 210, to SYSID, 211). It is C if currently connected, or N if currently not connected.

CNTIME, 217—which contains a value representing the amount of time CUID, 210, has been connected to SYSID, 211. It is zero if CUID, 210, is currently not connected to SYSID, 211.

WTTIME, 218—which contains a value representing the amount of time SYSID, 211, has been waiting to connect to CUID, 210. It is zero if SYSID, 211, is currently connected to CUID, 210.

The Path Control Table (FIG. 2) is part of the Logical Path Scheduler (or LPS) program (FIG. 1 at 106) for controlling the connections of logical paths, 160–162, between systems, 100–102, and control units, 140, 141. The table is constructed at initialization of the system executing the Logical Path Scheduler (or LPS) program, 106, known by this invention as the master system. At system (channel) initialization the system attempts to establish a logical path to each control unit that is configured to it. (This mechanism is described in the previously mentioned and incorporated by reference co-pending application Ser. No. 07/576,561, "Logical Channel Paths in a Computer I/O System", by J. C. Elliott, filed Aug. 31, 1990, and assigned to the assignee of the present invention.) These connections are recorded in tables which are kept in each system. New with this invention is that the master system now receives records of all system connections by requesting the table from each system. FIG. 4 depicts a high level view of this logic. As can be seen from FIG. 4, after the logical paths for this processor have been established (FIG. 4 at 40) and the records representing the established configuration have been received (FIG. 4 at 41), the records for all system connections are received (FIG. 4 at 42). Communicating configuration information among elements of the I/O subsystem is well known in the art, described, e.g., in co-pending application Ser. No. 07/576,569, "Notification and Verification of State Changes in a Data Processing Input/Output System", by P. J. Brown, et al., filed Aug. 31, 1990. From these records the LPS program, 106, in the master system constructs (FIG. 4 at 43) the Path Control Table, 200, described in FIG. 2.

Figure 3:
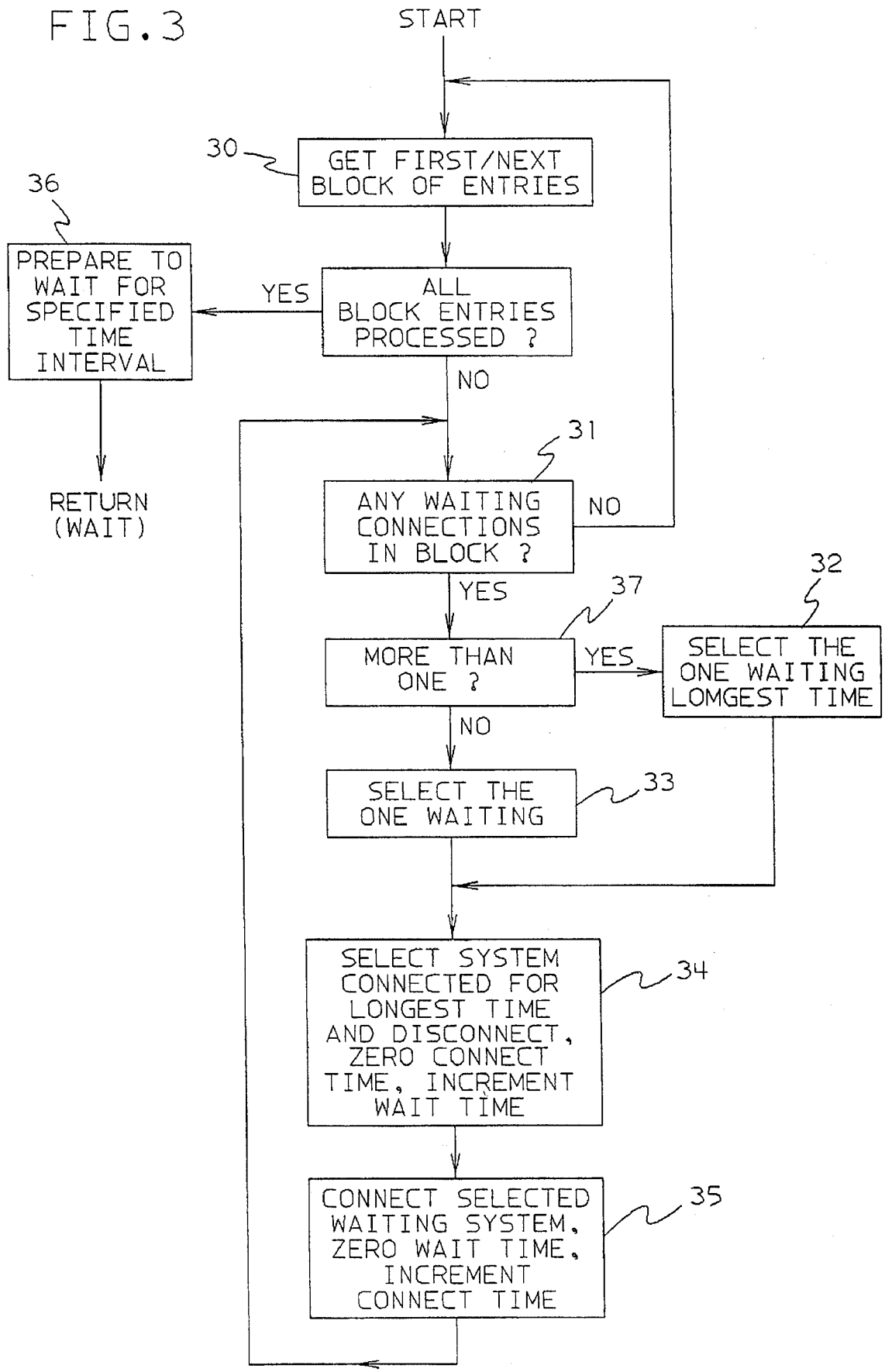
FIG. 3 is a flowchart showing the high level logic flow of the Logical Path Scheduler program.

FIG. 3 depicts the method by which the LPS program, 106, with the Path Control Table, 200, achieves the invention. As stated previously, the Logical Path Scheduler, 106, is a program which is part of the operating system, 103–105, executing in one of the systems, 100–102, connected to the dynamic switch, 120, 121. The system, 101, executing the Logical Path Scheduler, 106, is designated the master system. The designation of which system, 100–102, is to operate as the master system is governed by an initialization parameter to the LPS program, 106. The LPS program, 106, executes as a task which is started at system initialization and continues executing as long as the operating system, 104, is active. The LPS program, 106 builds and maintains the Path Control Table, 200. Once active, entry to the LPS program, 106, for execution is controlled by an initialization parameter indicating the time interval at which it should operate. At the end of each time interval, the LPS program, 106, receives control to begin execution. Upon completion of its function the LPS program, 106, resumes waiting for the specified time interval. The time interval is designated by an initialization parameter to the LPS program, 106, or if not specified, a default of 5 seconds is used. Upon receiving control the LPS program, 106, operates as follows. It searches the Path Control Table, 200, by each block of control unit entries,(FIG. 3 at 30) until all blocks of control unit entries are processed. The Logical Path Scheduler then enters a wait for the specified time interval (FIG. 3 at 36). For each block of entries, if there are any entries representing systems waiting for connection to this control unit through a particular path, (FIG. 3 at 31) then a disconnection and connection must occur. If there is more than one entry representing a requested connection (FIG. 3 at 37), then the entry waiting the longest for connection (the highest value in WTTIME) will be selected for connection processing (FIG. 3 at 32). If there is only one entry waiting for connection then that entry is selected for connection processing (FIG. 3 at 33). Next, the entry representing the control unit and system through a particular path which have been connected for the longest time (highest value of CNTIME) is selected for disconnection processing (FIG. 3 at 34). The disconnection is made by means of frames sent to the dynamic switch, 120, 121, as described in the previously incorporated by reference co-pending application Ser. No. 07/576,561 (Logical Channel Paths In A Computer I/O System), and in the previously incorporated by reference U.S. Pat. No. 5,107,489 (Switch And Its Protocol For Making Dynamic Connections). CNTIME is set to zero, STAT is set to N, and tracking of time in WTTIME is now started by incrementing its value by 1 (FIG. 3 at 34). The entry representing the control unit and system through a particular path, selected previously for connection processing, (FIG. 3 at 32 and 33) is then processed. The connection is made by means of frames sent to the dynamic switch, 120, 121, as described in the previously incorporated by reference co-pending application Ser. No. 07/576,561 (Logical Channel Paths In A Computer I/O System), and the previously incorporated by reference U.S. Pat. No. 5,107,489 (Switch And Its Protocol For Making Dynamic Connections). WTTIME is set to zero, STAT is set to C and tracking of time in CNTIME is now started by incrementing its value by 1 (FIG. 3 at 35). By example, using the Path Control Table, 200, described in FIG. 2, and the logic of the LPS program, 106, as described in FIG. 3, the result is the path F0-30, 161, between control unit A 140, and system 1 101, is disconnected and the path F0-00 between control unit A, 140, and system 2, 102, is connected. Additionally, the path F1-10, 162, between control unit A, 140, and system 2, 102, is disconnected and the path F0-10 between control unit A, 140, and system 3, 100, is connected. Also, the path F2-30, 160, between control unit B, 141, and system 1, 101, is disconnected, and the path F2-00 between control unit B, 141, and system 2, 102, is connected.

At this point any further device-level I/O requests from system 1, 101, through the paths F0-30, 161, and F2-30, 160, and from system 2, 102, through the path F1-10, 162, are queued by the IOS programs, 164, 165 in the operating systems, 104, 105, executing in those respective processors. Any device-level I/O requests, which had been queued in system 2, 102, for the paths F0-00 and F2-00, and queued in system 3, 100, for the path F0-10 are now sent over the connected path to the control unit (A or B), 140, 141, for execution.

In a further refinement of the preferred embodiment, the LPS program, 106, is also caused to execute under certain dynamic conditions other than those described previously. In implementations which support the dynamic reconfiguration of the channel paths in the I/O subsystem, the LPS program, 106, is a participant in the reconfiguration process. During a reconfiguration, for example the varying off-line of channel paths, the operating systems, 103–105, in the systems, 100–102, attached to the channels, 107–111, receive control to update their representation of the configuration. The LPS program, 106, is invoked by the operating system, 103–105, to update the Path Control Table, 200, with the changes to the configuration. The adjusted configuration is input to the LPS program, 106, and the Path Control Table, 200, is adjusted accordingly.

Additionally, in this refinement, if the master system fails, any of the other systems which are executing, upon detection of the failure, can assume the responsibilities of the master system. This assumption of master responsibility is broadcast to all the systems, for example via the IBM ESCON manager (ESCM) (FIG. 1 at 115–117). The ESCON manager (ESCM) communicates, via conventional teleprocessing means (FIG. 1 at 180–182), with ESCON manager programs in the other operating systems. The ESCON manager, which is part of the IBM MVS/ESA operating system, exists in prior art and is described in publications GA23-0383, Introducing Enterprise Systems Connection, GC23-0422, Introducing the Enterprise Systems Connection Manager, SC23-0425 ESCON Manager User's Guide, and SC23-0427 ESCON Manager API Automation. By means of this ESCM communication all current connection status is received and the Path Control Table, 200, constructed. Normal state processing then resumes as described previously.

Last Operational Path Processing

When the last available path to a dynamic pathing device becomes not operational, the device remains on-line and I/O continues to be allowed. This device level I/O is queued by the IOS program, 163–165, in the operating system, 103–105. All work in that system attempting to use the device stays active. This is unlike prior art where I/O is failed and work terminated. When the problem causing the path to become not operational is fixed and the path is made operational, the device-level I/O is dequeued and I/O resumes. It should be noted that this queuing/dequeuing of I/O requests is well known in the prior art of the IBM MVS/ESA operating system. In prior art, for I/O devices that do not support dynamic pathing, when a path becomes not operational the I/O requests are queued. Manual intervention is required to either make the path operational or to fail the request. With this invention, for I/O devices supporting dynamic pathing, the same queuing is performed but no manual intervention is required to allow eventual resumption of I/O.

While the described preferred embodiment utilizes a simple time interval to initiate disconnection and connection of logical paths, 160–162, and a simple LRU (least recently used) algorithm to determine which connections to make, other techniques are not precluded by this invention. In another embodiment, the invocation of the LPS program, 106, could be initiated by an unconnected system requesting the LPS, 106, processing to occur. Any known priority or resource relative utilization scheme could be used by the unconnected system to determine when to initiate the processing. For example, an algorithm based on utilization of the control unit, 140, 141, could be used. In this scheme, systems, 100–102, with greater relative utilization of the control unit, 140, 141, would receive longer time slices before disconnection.

While we have illustrated and described preferred embodiments of our invention, it is to be understood that we do not limit ourselves to the precise construction herein disclosed and the right is reserved to all changes and modifications coming within the scope of the invention as defined in the following claims.

The invention claimed is:

1. A logical path scheduling apparatus comprising:
   a. one or more processors each controlled by an operating system, each of said one or more processors having one or more channels;
   b. a dynamic switch having a plurality of ports, said dynamic switch being connected at a first of said ports to a first of said channels, and at a second of said ports to a second of said channels;
   c. a control unit connected to and controlling one or more devices, said control unit being connected to said dynamic switch at a third of said ports, said control unit being connected to said first channel when said first port is connected by a first logical path to said third port, and being connected to said second channel when said second port is connected by a second logical path to said third port, said control unit being capable of simultaneous connection to a maximum number N of said one or more channels by said maximum number N of logical paths; and
   d. logical path scheduler (LPS) means, in a master operating system in one of said one or more processors, for managing requirements for at least N+1 of said logical paths among said one or more channels, each of said at least N+1 logical paths being capable of being connected to form a connected logical path between one of said channels and said control unit and having a current status of either connected or disconnected, said LPS means comprising (1) a path control table having entries corresponding to said at least N+1 logical paths, each of said entries containing information on the current status of the corresponding logical path, and (2) allocation means for examining said entries to determine whether particular ones of said logical paths should be connected, disconnected, or left in a current status, for disconnecting one or more of said logical paths in accordance with such determination as required to permit one or more currently disconnected logical paths to be connected, and for connecting said one or more currently disconnected logical paths to form connected logical paths between one or more of said channels and said control unit.

2. The apparatus of claim 1 in which each of said path control table entries comprises a control unit identifier identifying said control unit, a system identifier identifying said processor having said operating system, a path identifier identifying an associated logical path, a status identifier identifying no more than N paths as being connected at any instant, and an allocation field for use by said allocation means in said determining.

3. The apparatus of claim 2 in which said allocation field comprises a connect time field for identifying a time interval of connection of said system to said control unit through said particular one of said logical paths.

4. The apparatus of claim 2 in which said allocation field comprises a wait time field for identifying a time interval of waiting for connection to said control unit by said system through said particular one of said logical paths.

5. The apparatus of claim 1 in which each of said processors comprises means for communicating configuration changes to said master operating system for recordation in said path control table by said LPS.

6. The apparatus of claim 1 in which each of said operating systems comprises means for queuing I/O requests, for which no logical path currently exists, for subsequent execution.

7. A logical path scheduling apparatus comprising:
   a. one or more processors each controlled by an operating system, each of said one or more processors having one or more channels and each of said one of more processors comprising means for communicating configuration changes to a master operating system for recording in a path control table by a logical path scheduler (LPS) means, each of said operating systems comprising means for queuing I/O requests, for which no logical path currently exits, for subsequent execution;
   b. a dynamic switch having a plurality of ports, said dynamic switch being connected at a first of said ports to a first of said channels, and at a second of said ports to a second of said channels;
   c. a control unit connected to and controlling one or more devices, said control unit being connected to said dynamic switch at a third of said ports, said control unit being connected to said first channel when said first port is connected by a first logical path to said third port, and being connected to said second channel when said second port is connected by a second logical path to said third port, said control unit being capable of simultaneous connection to a maximum number N of said one or more channels by said maximum number N of logical paths; and
   d. said logical path scheduler (LPS) means, in said master operating system in one of said one or more processors, for managing requirements for at least N+1 of said logical paths among said one or more channels, each of said at least N+1 logical paths being capable of being connected to form a connected logical path between one of said channels and said control unit and having a current status of either connected or disconnected, said LPS means comprising allocation means for determining whether a particular one of said logical paths should be connected, disconnected, or left in a current status and effecting a connection or disconnection, as appropriate, said LPS means further comprising (1) said path control table, said path control table having entries corresponding to said at least N+1 logical paths, each of said entries comprising a control unit identifier identifying said control unit, a system identifier identifying said processor having said operating system, a path identifier identifying said associated logical path, a status identifier identifying no more than N paths as being connected at any instant, and each of said one or more entries further comprising an allocation field for use by said allocation means in said determining, said allocation field comprising a connect time field for identifying a time interval of connection of said system to said control unit through said associated logical path, said allocation field further comprising a wait time field for identifying a time interval of waiting for connection to said control unit by said system through said associated logical path, and (2) allocation means for examining said entries to determine whether particular ones of said logical paths should be connected, disconnected, or left in a current status, for disconnecting one or more of said logical paths in accordance with such determination as required to permit one or more currently disconnected logical paths to be connected, and for connecting said one or more currently disconnected logical paths to form connected logical paths between one or more of said channels and said control unit.

8. A method for performing logical I/O path scheduling in a data processing system configured to simultaneously connect N logical paths between channels and control units, said method comprising the steps of:

a) periodically monitoring a path control table in a master operating system in one of a complex of one or more processors, said path control table comprising at least N+1 connection status entries, to determine if any of said status entries represent a "wait" status, each of said entries representing status of an associated path between a control unit and one of a plurality of channels in said one or more processors, said paths being connected through a dynamic switch; and b) initiating at least one disconnect operation and at least one connect operation to said dynamic switch when said step of periodically monitoring detects at least one said "wait" status.

9. The method of claim 8 further comprising the step of queuing for subsequent execution, within an I/O supervisor in an operating system in one of said processors, an I/O request for a currently not-connected dynamic pathing device connected to said control unit.

10. The method of claim 8 further comprising the step of initializing said path control table by having each of said one or more processors determine its configuration status and transmit said configuration status to said master operating system to be included in said path control table.

11. The method of claim 10 further comprising the step of updating said path control table by having one of said one or more processors, having undergone a change in said configuration status, transmit an updated configuration status to said master operating system to be included in said path control table.

12. The method of claim 10 further comprising performing, in the event of a failure of said master operating system, the steps of a new master operating system in another of said one or more processors assuming master operating system responsibility by broadcasting to all others of said one or more processors notice of said assuming, and initializing a new path control table by obtaining configuration status from each of said all others of said one or more processors.

13. A method for performing logical I/O path scheduling in a data processing system configured to simultaneously connect N logical paths between channels and control units, said method comprising the steps of:

a) initializing a path control table, comprising at least N+1 connection status entries, each of said entries representing status of an associated path between a control unit and one of a plurality of channels in a complex of one or more processors, said paths being connected through a dynamic switch, by having each of said one or more processors determine its configuration status and transmit said configuration status to a master operating system in a master one of said complex of one or more processors to be included in said path control table;

b) queuing for subsequent execution, within an I/O supervisor in one of said processors, an I/O request for a currently non-connected dynamic pathing device connected to said control unit;

c) periodically monitoring said path control table in said master operating system, to determine if any of said entries represent a "wait" status;

d) initiating at least one disconnect operation and at least one connect operation to said dynamic switch when said step of periodically monitoring detects at least one "wait" status;

e) updating said path control table by having one of said one or more processors, having undergone a change in said configuration status, transmit an updated configuration status to said master operating system to be included in said path control table; and f) on detecting a failure of said master operating system, having a new master operating system in another of said one or more processors assume master operating system responsibility by broadcasting to all others of said one or more processors notice of said assuming, and having said new master operating system initialize a new path control table by obtaining configuration status from each of said all others of said one or more processors.

14. In a computer system complex comprising one or more processors each controlled by an operating system, each of said one or more processors having one or more channels; a dynamic switch having a plurality of ports, said dynamic switch being connected at a first of said ports to a first of said channels, and at a second of said ports to a second of said channels; and a control unit connected to and controlling one or more devices, said control unit being connected to said dynamic switch at a third of said ports, said control unit being connected to said first channel when said first port is connected by a first logical path to said third port, and being connected to said second channel when said second port is connected by a second logical path to said third port, said control unit being capable of simultaneous connection to a maximum number N of said one or more channels by said maximum number N of logical paths, apparatus for managing requirements for at least N+1 of said logical paths among said one or more channels, comprising:

a. means for defining a path control table having entries corresponding to said at least N+1 logical paths, each of said at least N+1 logical paths being capable of being connected to form a connected logical path between one of said channels and said control unit and having a current status of either connected or disconnected, each of said entries containing information on the current status of the corresponding logical path; and b. means for examining said entries to determine whether particular ones of said logical paths should be connected, disconnected, or left in their current status;

c. means for disconnecting one or more of said logical paths in accordance with such determination as required to permit one or more currently disconnected logical paths to be connected; and d. means for connecting said one or more currently disconnected logical paths to form connected logical paths between one or more of said channels and said control unit.

15. In a computer system complex comprising one or more processors each controlled by an operating system, each of said one or more processors having one or more channels; a dynamic switch having a plurality of ports, said dynamic switch being connected at a first of said ports to a first of said channels, and at a second of said ports to a second of said channels; and a control unit connected to and controlling one or more devices, said control unit being connected to said dynamic switch at a third of said ports, said control unit being connected to said first channel when said first port is connected by a first logical path to said third port, and being connected to said second channel when said second port is connected by a second logical path to said third port, said control unit being capable of simultaneous connection to a maximum number N of said one or more channels by said maximum number N of logical paths, a method of managing requirements for at least N+1 of said logical paths among said one or more channels, comprising the steps of:

a. defining a path control table having entries corresponding to said at least N+1 logical paths, each of said at least N+1 logical paths being capable of being connected to form a connected logical path between one of said channels and said control unit and having a current status of either connected or disconnected, each of said entries containing information on the current status of the corresponding logical path; and b. examining said entries to determine whether particular ones of said logical paths should be connected, disconnected, or left in their current status;

c. disconnecting one or more of said logical paths in accordance with such determination as required to permit one or more currently disconnected logical paths to be connected; and d. connecting said one or more currently disconnected logical paths to form connected logical paths between one or more of said channels and said control unit.

16. The method of claim 15 in which each of said path control table entries contains connect time information indicating how long the corresponding logical path has remained connected if it is currently connected, said disconnecting step comprising the step of using said connect time information to select one or more of said logical paths for disconnection.

17. The method of claim 16 in which said disconnecting step comprises the step of selecting from a set of eligible logical paths the logical path with the longest connect time for disconnection.

18. The method of claim 15 in which each of said path control table entries contains waiting time information indicating how long the corresponding logical path has waited for connection if it is currently disconnected, said connecting step comprising the step of using said waiting time information to select one or more of said logical paths for disconnection.

19. The method of claim 18 in which said disconnecting step comprises the step of selecting from a set of eligible logical paths the logical path with the longest waiting time for connection.

* * * * *